US009578035B2

(12) United States Patent
Kravitz et al.

(10) Patent No.: US 9,578,035 B2
(45) Date of Patent: *Feb. 21, 2017

(54) SYSTEM AND METHOD TO USE A CLOUD-BASED PLATFORM SUPPORTED BY AN API TO AUTHENTICATE REMOTE USERS AND TO PROVIDE PKI- AND PMI-BASED DISTRIBUTED LOCKING OF CONTENT AND DISTRIBUTED UNLOCKING OF PROTECTED CONTENT

(71) Applicant: T-Central, Inc., Palo Alto, CA (US)

(72) Inventors: David W. Kravitz, Fairfax, VA (US); Donald Houston Graham, III, Pasadena, CA (US); Josselyn L. Boudett, Clearwater, FL (US); Russell S. Dietz, Los Gatos, CA (US)

(73) Assignee: T-Central, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,861

(22) Filed: May 13, 2016

(65) Prior Publication Data

US 2016/0337361 A1    Nov. 17, 2016

Related U.S. Application Data

(63) Continuation of application No. 14/715,588, filed on May 18, 2015, now Pat. No. 9,356,916, and a continuation-in-part of application No. 14/218,897, filed on Mar. 18, 2014, now Pat. No. 9,270,663, and a continuation-in-part of application No. 13/481,553, filed on May 25, 2012, now abandoned, and a continuation-in-part of application No. 13/096,764, filed on Apr. 28, 2011, now abandoned.

(60) Provisional application No. 62/133,371, filed on Mar. 15, 2015, provisional application No. 61/994,885, filed on May 17, 2014, provisional application No.
(Continued)

(51) Int. Cl.
| | |
|---|---|
| H04L 29/06 | (2006.01) |
| H04L 9/00 | (2006.01) |
| H04L 9/08 | (2006.01) |
| H04L 9/32 | (2006.01) |
| H04L 9/30 | (2006.01) |

(52) U.S. Cl.
CPC .............. *H04L 63/10* (2013.01); *H04L 9/006* (2013.01); *H04L 9/0822* (2013.01); *H04L 9/0894* (2013.01); *H04L 9/30* (2013.01); *H04L 9/3247* (2013.01); *H04L 9/3263* (2013.01); *H04L 63/0435* (2013.01); *H04L 63/0442* (2013.01); *H04L 63/061* (2013.01); *H04L 63/08* (2013.01)

(58) Field of Classification Search
None
See application file for complete search history.

(56) References Cited

U.S. PATENT DOCUMENTS

| | | |
|---|---|---|
| 7,093,121 B2 | 8/2006 | Barton et al. |
| 7,571,325 B1 | 8/2009 | Cooley et al. |
| | (Continued) | |

*Primary Examiner* — Amir Mehrmanesh
(74) *Attorney, Agent, or Firm* — Schwabe, Williamson & Wyatt P.C.

(57) ABSTRACT

A security system for authenticating users and protecting content that provides an application program interface (API) with a Cloud Platform integration (Platform) to extend the security capabilities of Public Key Infrastructure and Privilege Management Infrastructure systems to authenticated external users and protected content.

4 Claims, 2 Drawing Sheets

Related U.S. Application Data

61/792,927, filed on Mar. 15, 2013, provisional application No. 61/650,866, filed on May 23, 2012, provisional application No. 61/490,952, filed on May 27, 2011, provisional application No. 61/330,226, filed on Apr. 30, 2010, provisional application No. 61/367,574, filed on Jul. 26, 2010, provisional application No. 61/367,576, filed on Jul. 26, 2010, provisional application No. 61/416,629, filed on Nov. 23, 2010.

(56) References Cited

U.S. PATENT DOCUMENTS

| | | | |
|---|---|---|---|
| 7,966,646 B2 | 6/2011 | Chou et al. | |
| 8,346,929 B1* | 1/2013 | Lai | G06Q 10/10 709/226 |
| 2005/0044197 A1 | 2/2005 | Lai | |
| 2009/0111424 A1* | 4/2009 | Bengtsson | H04L 63/18 455/411 |
| 2009/0150968 A1* | 6/2009 | Ozzie | H04L 63/08 726/1 |
| 2013/0262857 A1 | 10/2013 | Neuman et al. | |

* cited by examiner

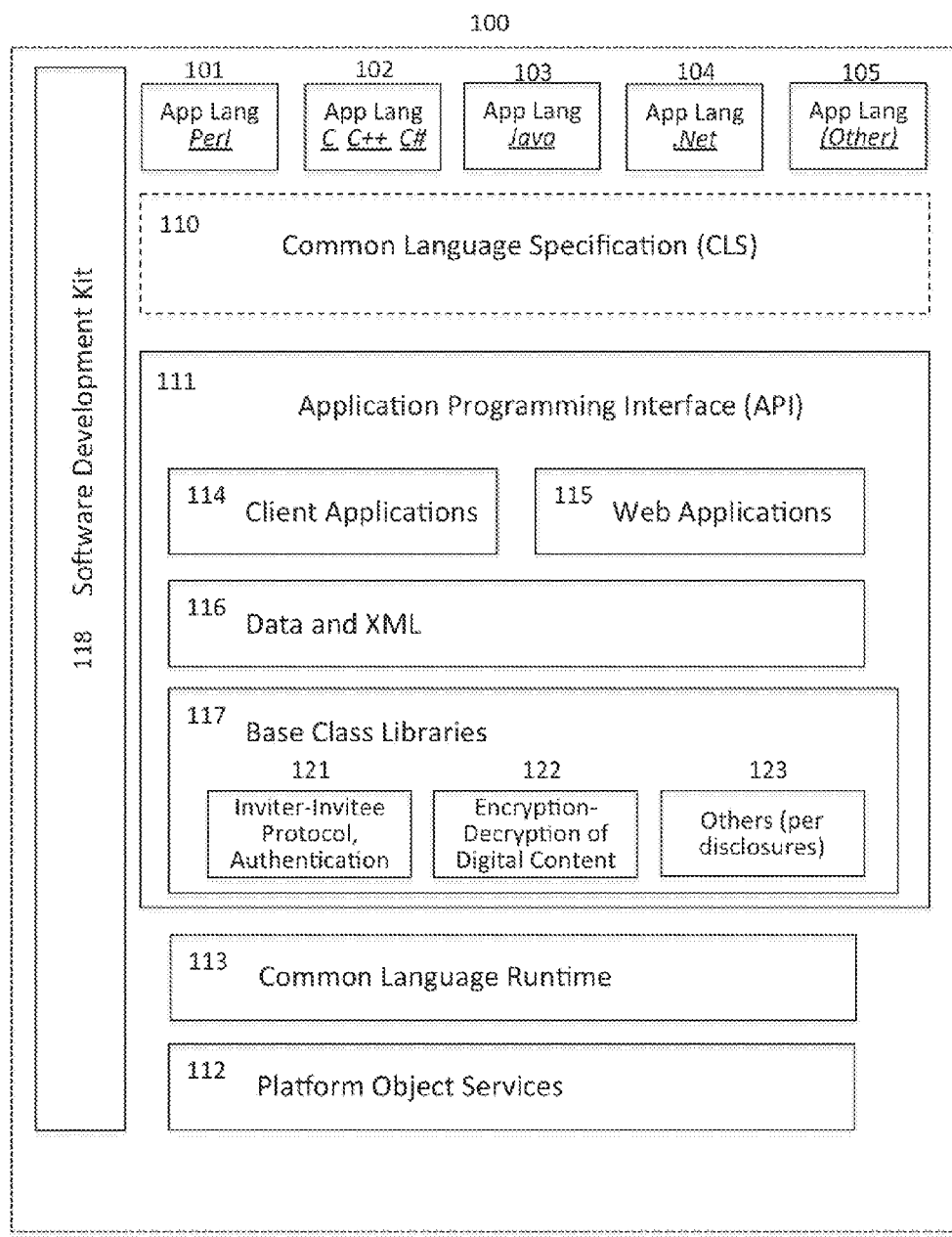
Figure 1: Framework for API and Platform Integration

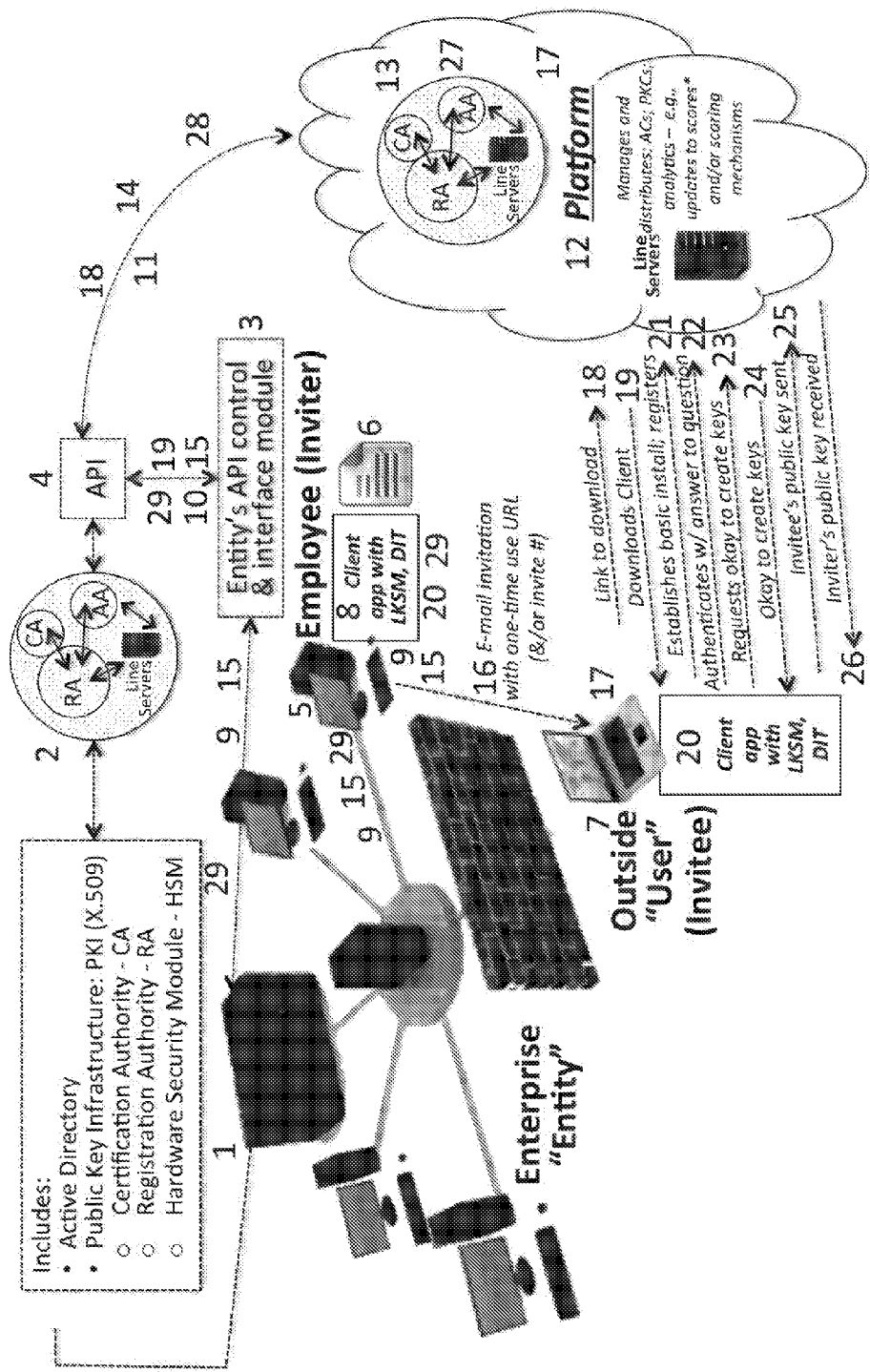

SYSTEM AND METHOD TO USE A CLOUD-BASED PLATFORM SUPPORTED BY AN API TO AUTHENTICATE REMOTE USERS AND TO PROVIDE PKI- AND PMI-BASED DISTRIBUTED LOCKING OF CONTENT AND DISTRIBUTED UNLOCKING OF PROTECTED CONTENT

This application is a continuation of and claims priority to U.S. patent application Ser. No. 14/715,588, filed May 18, 2015, which claims priority under 35 U.S.C. §119(e) from U.S. Provisional Patent Application No. 61/994,885, filed May 17, 2014, titled "A System with PKI- & PMI-Based Distributed Locking, Unlocking and Automated Distribution of Protected Content," and from U.S. Provisional Patent Application No. 62/133,371, filed Mar. 15, 2015, titled "A Cloud-based Platform supported by API(s) and SDK(s) providing a System with PKI- & PMI-Based Distributed Locking, Unlocking and Automated Distribution of Protected Content and/or Scoring of Users and/or Scoring of End-Entity Access Means," all of which are incorporated herein by reference and for all purposes.

U.S. patent application Ser. No. 14/715,588 is a continuation-in-part and claims priority under 35 U.S.C. §120 from co-pending U.S. patent application Ser. No. 14/218,897, tilted "System And Method To Enable Pki- And Pmi-Based Distributed Locking Of Content And Distributed Unlocking Of Protected Content And/Or Scoring Of Users And/Or Scoring Of End-Entity Access Means—Added," filed Mar. 18, 2014, by Graham, et al, which claimed priority under 35 U.S.C. §119(e) from U.S. Provisional Patent Application No. 61/792,927, filed Mar. 15, 2013, entitled "System And Method To Enable Pki- And Pmi-Based Distributed Locking Of Content And Distributed Unlocking Of Protected Content And/Or Scoring Of Users And/Or Scoring Of End-Entity Access Means," by Kravitz et al., which incorporated herein by reference and for all purposes and which is a continuation in part and claimed priority under 35 U.S.C. §120 from co-pending U.S. patent application Ser. No. 13/481,553, tilted "Methods And Apparatus For Preventing Crimeware Attacks," filed May 25, 2012, by Kravitz, et al, which claimed priority under 35 U.S.C. §119(e) from U.S. Provisional Patent Application No. 61/650,866, filed May 23, 2012, entitled "Method And Apparatus For A Cybersecurity Ecosystem," by Kravitz et al., which is incorporated herein by reference and for all purposes and which also claimed priority under 35 U.S.C. §119(e) from U.S. Provisional Patent Application No. 61/490,952, filed May 27, 2011, entitled "Method And Apparatus For A Financial Document Clearinghouse And Secure Delivery Network Cybersecurity Ecosystem," by Graham III et al., which is incorporated herein by reference and for all purposes and which is a continuation in part and claimed priority under 35 U.S.C. §120 from U.S. patent application Ser. No. 13/096,764, entitled "Methods And Apparatus For A Financial Document Clearinghouse And Secure Delivery Network," filed Apr. 28, 2011, by Graham III et al., which claimed priority under 35 U.S.C. §119(e) from each of the four following U.S. provisional applications: i) U.S. Provisional Patent Application No. 61/330,226, filed Apr. 30, 2010, entitled "Clearinghouse Server For Financial Data Delivery And Financial Services," by Graham III et al., ii) U.S. Provisional Patent Application No. 61/367,574, filed Jul. 26, 2010, entitled "Methods And Systems For A Clearinghouse Server For Delivery Of Sensitive Data," iii) U.S. Provisional Patent Application 61/367,576, filed Jul. 26, 2010, entitled "Methods And Apparatus For A Financial Document Clearinghouse System," by Graham III et al., and iv) U.S. Provisional Patent Application No. 61/416,629, filed Nov. 23, 2010, entitled "Methods And Apparatus For Secure Data Delivery And User Scoring In A Financial Document Clearinghouse," by Graham III et al., each of which is incorporated by reference and for all purposes.

BACKGROUND

Field of the Described Embodiments

The present disclosure relates generally to providing one or more Application Programming Interfaces (APIs) integrating with a Platform Service (either Cloud, local server-based, or other) to provide access and use of one or more of the Platform's features. An example of one such feature could be to enable the extension of security credentials for entities such as enterprise businesses, government, small business, individuals, systems integrators, independent software vendors and others, "Entities", in order to effectuate more secure communication between an Entity and one or more remote third parties (for example, from an enterprise Entity to a third party customer beyond that enterprise Entities' network firewall).

Most Entities are faced with similar, common security challenges. For many of such challenges, positive security solutions can sometimes be achieved through the use of cryptography. Cryptographic security solutions typically require well-tested solutions which can be challenging to execute and deliver reliably and securely, even for professional experienced in the field. According to Bruce Schneier (respected cryptographer, computer security & privacy specialist, and writer): " . . . two cryptography truisms. The first is that cryptography is hard . . . . The second is that cryptographic implementation is hard . . . " and "We're great at mathematically secure cryptography, and terrible at using those tools to engineer secure systems". For these reasons, well-designed, well-executed, tested, cryptographic tools that provide useful and flexible solutions that meet actual security needs can be difficult for those Entities to produce for themselves. Therefore a Platform and API with useful and tested cryptographic solutions could be of benefit to those Entities.

The Platform with its API(s) and Software Development Kit (SDK) may make it easier and simpler for software designers, application developers, Entities and others to add sophisticated cryptographic security solutions to their applications and/or Entity software solutions. The Platform, API and related technology may allow them to devote more time to meeting software requirements rather than dealing with the unique challenges of developing secure cryptographic systems, thereby reducing overall development time.

SUMMARY OF THE DESCRIBED EMBODIMENTS

Application programmers, including application developers, often provide Users with software applications that enable various services for the User. For example, an application may be provided to a user to authenticate the identity of a remote third party with whom the user desires to establish an authenticated, secure communication line (as described later herein). In such a case, the application programmer or platform service provider provisions an API with the authentication feature, and exposes various inputs to permit the user to activate the feature to implement the feature. The application programmer may implement the service of authentication based on knowledge of application programming interfaces (APIs) that are offered by various technology service and/or platform providers. Each platform or service provider tends to have proprietary or specific APIs used to invoke the services it offers. The application programmer utilizes the APIs provided by the provider, with the appropriate parameters, to invoke the desired feature (e.g., authentication of a remote third party).

API (Application Programming Interface) may include a set of routines, protocols, and tools for building software applications that utilize those specific routines, protocols and tools. Generally an API is considered to be a software component in terms of its defined operations, inputs, outputs, and underlying types. The Platform API may define and provide access to (and use of) the unique functionalities of the Platform. A software developer may incorporate the API into his/her software application. An API may make it easier to develop a software application by providing some of the building blocks required by an application developer, which he/she may then put together.

APIs may be created and offered using various methods such as SOAP (SOAP stands for Simple Object Access Protocol, and is XML based). Another is REST (short for Representational State Transfer. REST uses standard HTTP methods). More description of common API technology can be found at http://en.wikipedia.org/wiki/Application_programming_interface A Platform is often hosted in the Cloud (e.g., "Cloud computing"; "Platform as a Service"). Cloud computing (see http://en.wikipedia.org/wiki/Cloud_computing). At the foundation of cloud computing is the broader concept of converged infrastructure and shared services. Cloud computing, or in simpler shorthand just "the cloud", also focuses on maximizing the effectiveness of the shared resources.

The Platform, as disclosed herein, may also be hosted on a server within an Entity business network or elsewhere other than in the Cloud.

The Platform may support application developers to build software by employing the SDK tools to better use the capabilities of the API in order to control, access and utilize the features and functions of the Platform. Using any of these capabilities, for this disclosure, an Entity and/or User could gain access to one or more of the security, authentication, cryptographic, and other capabilities as disclosed herein and/or priority claims hereof, including U.S. Provisional Patent Applications No. 61/994,885 and 62/133,371.

The Platform and API solutions disclosed herein may provide a User-Directed, Authenticated, Cryptography-Enabling, Security-Focused Ecosystem (the "Security Ecosystem" as described in Appendix A of Application No. 62/133, 371) through which an Entity and/or an Entity's "Users" (i.e., customers, clients, prospects, vendors, associates, employees, and/or others with whom an Entity may have a need to share sensitive information) can use one or more of the components of the Security Ecosystem to address one or more security challenges encountered by an Entity and/or User.

Some examples of capabilities that might be accessed through the Platform and API may include (but are not limited to) the following features: Cross-Certification (the Platform may cross-certify an Entity's authorized identities with those of another trusted Entity that also uses the Platform; cross-certification may result in identities on one Entity being recognized by another Entity in order to facilitate inter-Entity, secure, point-to-point encrypted communication with trusted identities). Go Paperless with Users (may eliminate some printing and postage costs of sending statements and/or invoices (and/or other digital content) and/or alternatively the cumbersome practice of requiring Users to login and manually retrieve such digital content, by implementing a process of encrypting such digital content, thus allowing for such digital content to their authenticated recipients for decryption). Digital Transaction Signing (which may support regulatory and/or business needs by providing non-repudiable authorization for some high value transactions, e.g., money transfers, account changes, medical orders, access authorization, etc.). Digital Signatures (may provide an Integrated, Persistent, Non-Repudiable Digital Signature capability between an Entity and a User and/or another Entity that could facilitate the efficiency and reliability of remote document execution). Audit Trails (may provide an integrated Digital, Non-Repudiable, verifiable Audit Trail capability confirming chain of custody, access, etc. of encrypted digital files which, in turn, may reduce fraud). 2-Factor Authentication (may provide an integrated, digital, 2-factor authentication capability to greatly enhance the reliability of remote authentication and approvals as compared to common SMS messaging techniques). Tunable Security (the platform and/or API may include a series of configurable authorization controls, limitations and monitoring capabilities, together with tunable security tools and such features may be configured controlled by an Entity and/or Users.)

Benefits of the possible solutions that could be offered through the Platform and API are numerous with some of them being described as one or more of the following: a core security solution together with add-on, customizable features that can integrate and evolve with existing security solutions; a capability to enable an Entity to invite Users or individuals to a secure communication line without exposing the Entity Infrastructure; a function to allow an Entity system administrator to track, monitor and/or audit transmitted encrypted digital content; a capability to create a separate database of associates and affiliates, including the right to revoke any invitation or relationship; a capability for an Entity to send encrypted digital content outside an Entity firewall with a result being that such digital content may be as secure (or more secure) than within that firewall; a capability to integrate Platform and/or API data records with Active Directory (or a similar system) as well with an Entity's PKI (Public Key Infrastructure); a reduction in "Data Spawn" (i.e., a tendency of unencrypted sensitive digital content to be copied and transferred to another person, Entity and/or location and possibly copied and transferred repeatedly with a result being that the original sensitive digital content may become located in multiple places and/or with multiple individuals or entities, thus reducing its security) through the capabilities of the Platform and API whereby digital content may be transferred to multiple places and/or with multiple individuals or entities in an encrypted format and may be stored in an encrypted format, thus reducing an uncontrolled and/or un-audited distribution of unencrypted sensitive digital content.

The actions of the Platform may be selectively changed, controlled and utilized via the API through Entity-written code, thus providing application-specific security software required by an Entity or end User (such functions may be unique, custom, common or generic). The functionality of the Platform may include the cryptographic security functionality desired by the Entity to provide it with one or more needed products, functions, solutions, capabilities, etc. For example these may include: the inviter-invitee protocol; authentication functions; audit trail capabilities; or other products, functions, solutions, capabilities etc. as described in this disclosure and/or its priority claims, etc.

A Platform SDK (Software Development Kit) may include a set of software development tools that may allow a software developer to create custom software applications to utilize the capabilities of the Platform and/or API. A Platform and/or API in general may also be used or accessed by other Platforms. An example of this is the Uber platform (www.uber.com) which uses the Twilio API and platform (www.twilio.com) for the telecommunications needs that Uber provides to its users (e.g., a text that "your Uber driver has arrived"). Another example is that Uber also uses the Braintree API and platform (www.braintreepayments.com) for processing Uber customers' credit card payments.

One problem to address could be long-stalled "going-paperless" initiatives of some Entities: securely delivering statements, invoices, and other digital content to their Users as opposed to postal mail or the inconvenient "come and get it" paradigm (requiring Users to log into Entity websites and manually retrieve such digital assets. Billions of documents need to be delivered annually from Entities to their Users. Mail is expensive. The "come and get it" paradigm of Users logging onto Entity websites is only partially successful. The "going-paperless" problem is a manifestation of a broader problem confronting Entities: lack of a user-friendly, workable, authenticated, secure B2C and B2B communication capability. It is a challenge today for Entities to easily and securely exchange sensitive digital content with those outside their networks. The Platform and API Security Ecosystem's integrated software capabilities can ensure that the sensitive digital content, etc., that Entity users send to third parties who are off the Entity network can be delivered securely and privately to their correct, authenticated recipients.

The Platform and API Security Ecosystem's software is generally oriented to reduce impact on the existing manner in which Entity users create, store and transmit digital content to others. The Platform and API Security Ecosystem generally does not transport, store or have access to user's encrypted data. The Platform and API Security Ecosystem generally attempts to provide security to user's digital assets by providing a system to protect those assets though encryption, both in transit and at rest.

For Users the Platform and API Security Ecosystem may provide a tool so that Users may communicate privately, securely and with confidence not only with their authenticated friends, family and associates, but also with their user-created groups (e.g., schools, teams, clubs, political organizations, etc.)

The Platform and API Security Ecosystem (either directly or through Entities) may offer Users a downloadable application to install on a desktop or mobile device that will "lock" (encrypt) and "unlock" (decrypt) digital content using a cryptographic standard such as Advanced Encryption Standards (AES 256) as well as possibly other optional protocols. An authenticated, authorized recipient of a digital file may open it; locked files should not be viewable by advertisers, email or cloud providers, governments or others; private encryption keys can be held generally by their owners; and identities may be authenticated through user-managed tools.

As stated on Page 1 of Appendix B of Application No. 62/133,371 (as well as on Page 1 of Application No. 61/792,927) "The various inventions described herein contemplate functions or services fulfilled through service provider involvement. As stated in the various referenced APPENDICES, functions or services and/or data and/or keys may be split across multiple service providers or servers or systems and/or across multiple components of a given service provider or server or system." "Server" may also be considered to be a "computing device" with a processor(s) and memory.

Such splitting of functions or services and/or data and/or keys ("Items") across multiple service providers or servers or systems and/or across multiple components of a given service provider or server or system applies to the nature of flexibility of configurations relative to how those Items could be located on a Platform and/or a Line Server within the network infrastructure of an Entity and/or elsewhere. Such embodiments of the invention are suggested and/or described in the descriptions following the above quoted sections in the above priority filings.

BRIEF DESCRIPTION OF THE DRAWINGS

The present disclosure is described in greater detail below, with reference to the accompanying drawings, in which:

FIG. 1 is a block diagram of an illustrative architecture for interface and integration between the network of an Entity, an API and a Platform; and FIG. 2 is a flowchart illustrating an embodiment of the invention through the establishment of an authenticated relationship with an outside third party;

DETAILED DESCRIBED EMBODIMENTS

Referring to FIG. 1, an integration framework 100 is provided to support application developers that develop applications and services for Entities and/or Users in order to use the functions and services offered by the Platform and API. This framework may accommodate development in multiple languages (101, 102, 103, 104, 105, etc.) together with seamless integration by supporting those languages. The framework may support common open protocols (e.g., REST & SOAP). The framework may provide integrated class libraries for each of the programming languages supported. In one embodiment Common Language Specification (CLS) 110 allows designers of various languages to write code that is able to access underlying library functionality of the Platform Object Services layer 112. The specification 110 functions as a contract between language designers and library designers that can be used to promote language interoperability. By adhering to the CLS, libraries written in one language can be directly accessible to code modules written in other languages to achieve seamless integration between code modules written in one language and code modules written in another language. (More information on Common Language Specification can be found under Common Language Infrastructure on Wikipedia: http://en.wkipedia.org/wiki/Common_Language_Infrastructure). The framework 100 includes an application program interface (API) layer 111. The API layer 111 presents groups of functions that the applications 101-105 can call to access the resources and services provided by Platform Object Services layer 112. By exposing the API functions for multiple Platform services, application developers can create Web applications and/or direct application calls that can generate, control and/or make full use of the Platform resources, without needing to understand the complex inter-workings of how those cryptographically sophisticated Platform resources actually operate or are made available. Moreover, the Web applications can be written in any number of programming languages, and may be translated into an intermediate language supported by a common language runtime 113 and included as part of the Common Language Specification 110. In this way, the API layer 111 may provide methods to access all of the Platform resources. Additionally, the framework 100 can be configured to support API and/or direct calls placed by remote Client Apps of the service (see 20 in FIG. 2). This framework may modified for Entity and/or User purposes, particularly if a User is using a limited or dedicated function device, such as a mobile device (tablet, cellular phone, etc.).

Referring to FIG. 2, a Enterprise Entity has a network infrastructure, 1, including servers, workstations, firewall, Active Directory, Public Key Infrastructure (PKI), etc. In this embodiment it has a component of the invention with a separate Registration Authority-Certification Authority-Attribute Authority-Line Servers combination, 2 (which in another embodiment may not be present in the enterprise network environment). Both this and the Entity's API Control & Interface Module 3 interface with the API 4. On the workstation 5 of an Employee of the Entity, there is a sensitive plain test document (digital content) 6 that the employee would like to send to an Outside User 7. Using an installed Client App (which includes a Local Key Store Module—LKSM) 8 the employee (now an "Inviter") enters a request 9 into the Client App to invite the Outside User (now an "Invitee") to share a secure communication line between the two of them. The request 9 travels across the network to the Entity's API control and interface module 3. In conformance with the specifications of the API, the API control and interface module 3 transmits an invitation request message 10 to the API. The API transmits a translated message 11 to the Platform 12. The functions and services of the Platform 13 prepare an invitation response message 14 that is returned to the API 4. In accordance with a specification, the API converts the response to a message 15 understandable by the API control and interface module 3. The API control and interface module transmits the message 15 across the network to the Client App 8 on the Inviter workstation 5. The Client App prepares a message that the Inviter can send in an email 16 which arrives at the Invitee 17. The Invitee may click on a link in the email (or visits a designated website and enter a unique invitation code which is provided in the email) to download 18 the client app. The client app is downloaded 19 and installed 20. With the basic install completed, the client is registered 21 with the Platform. From the Platform the Invitee is asked a secret question (supplied by the Inviter in the original invitation request) to which the Invitee is expected to know the answer and upon supplying that answer, the installation of the LKSM is authenticated 22 with the Platform and the system. The Client App requests permission 23 to make certain cryptographic keys (including a Digital Identity Token—DIT). This is done upon approval 24 from the Platform with the Invitee's public keys then being sent 25 to the Platform. The Inviter's public key is received from the Platform 26 (which had received it upon the initial installation of the Inviter's Client App). The functions and services of the Platform 27 process and store this data and prepare a message 28 that is returned to the API 4. In accordance with a specification, the API converts this message to a message 29 understandable by the API control and interface module 3 and the Client App 8. The API control and interface module transmits the message 29 across the network to the Client App 8 on the Inviter workstation 5. The Client App 8 updates its LKSM with the invitation authentication and stores the Invitee's public key.

The invention claimed is:

1. A method, comprising:
   establishing a secure communications line between an entity device and a client device, the entity device need not have specific knowledge of cryptographic functions of a platform service;
   receiving, at one client device from the entity device, an invitation to authenticate a secure communications line with the entity device using an inviter-invitee protocol, the invitation including an authentication parameter;
   downloading, at the client device from a platform service, a client application based at least in part on the invitation, the platform service comprising a public key infrastructure, privilege management infrastructure, and at least one of certification authority, registration authority, attribute authority, or hardware security module, or a combination thereof;
   authenticating an identity of a user of the client device based at least in part on the authentication parameter included in the invitation;
   creating, at the client device, certain cryptographic keys, including at least one public-private key pair and a digital identity token upon receiving authentication approval from the platform service;
   transmitting, from the client device to the platform service, a public key of the public-private key pair of the client device which is subsequently received by the entity device;
   receiving, at the client device from the platform service, a public key corresponding to the inviting entity device with that device's digital identity token; and
   transmitting, from the client device to the platform service, a request to create the digital identity token;
   wherein the invitation includes a unique invitation code; and
   wherein the downloading the client application occurs based at least in part on the unique invitation code.

2. The method of claim 1, wherein the authentication parameter includes an answer to an authentication question; and wherein the identity of the user is authenticated based at least in part on transmitting the answer to the authentication question from the client device to the platform service.

3. The method of claim 1, wherein the platform service is located in at least one server in a cloud computing environment within a network; and
   wherein the platform service is accessible by an application programming interface.

4. A client device, comprising:
   one or more memory devices to store instructions; and
   one or more processing devices to execute the instructions to:
   establish a secure communications line between an entity device and the client device, the entity device need not have specific knowledge of cryptographic functions of the client device to access security or cryptographic functions;
   receive, from the entity device, an invitation to authenticate the secure communications line with the entity device using an inviter-invitee protocol, the invitation including an authentication parameter;
   download, from a platform service, a client application based at least in part on the invitation, the platform service comprising a public key infrastructure, privilege management infrastructure, and at least one of certification authority, registration authority, attribute authority, or hardware security module, or a combination thereof;

authenticate an identity of a user of the client device based at least in part on the authentication parameter included in the invitation;
create, at the client device, certain cryptographic keys, including at least one public-private key pair and a digital identity token upon receiving approval from the platform service;
transmit, to the platform service, a client device public key of the public-private key pair;
receive, from the platform service, a public key corresponding to the entity device;
receive, at the client device, a public key corresponding to the entity device with its digital identity token; and
transmit, from the client device to the platform service, a request to create the digital identity token;
wherein the invitation includes a unique invitation code; and
wherein the downloading the client application occurs based at least in part on the unique invitation code.

* * * * *